(12) United States Patent
Wong et al.

(10) Patent No.: US 7,194,059 B2
(45) Date of Patent: Mar. 20, 2007

(54) METHOD AND APPARATUS FOR SKIP-FREE RETIMING TRANSMISSION OF DIGITAL INFORMATION

(75) Inventors: Brian Wong, Rancho Palos Verdes, CA (US); Benjamim Tang, Hawthorne, CA (US); Scott Southwell, Seal Beach, CA (US); Allen Sakai, Rancho Palos Verdes, CA (US)

(73) Assignee: Zarlink Semiconductor, Inc., Ottowa (CA)

( * ) Notice: Subject to any disclaimer, the term of this patent is extended or adjusted under 35 U.S.C. 154(b) by 683 days.

(21) Appl. No.: 10/223,842

(22) Filed: Aug. 19, 2002

(65) Prior Publication Data

US 2003/0035504 A1    Feb. 20, 2003

Related U.S. Application Data

(60) Provisional application No. 60/313,383, filed on Aug. 17, 2001.

(51) Int. Cl.
*H04L 23/00* (2006.01)

(52) U.S. Cl. ............... 375/377; 375/363; 375/370; 375/371; 370/503; 370/506

(58) Field of Classification Search ............... 375/219, 375/222, 354, 359, 362, 363, 370, 371, 377, 375/369; 370/366, 480, 481, 498, 503, 505, 370/506, 377, 464; 327/291
See application file for complete search history.

(56) References Cited

U.S. PATENT DOCUMENTS

| | | | | |
|---|---|---|---|---|
| 4,661,966 A * | 4/1987 | Schreiner | ................... | 375/363 |
| 4,669,080 A * | 5/1987 | Aveneau et al. | ............ | 370/506 |
| 4,896,337 A * | 1/1990 | Bushy, Jr. | ................... | 375/371 |
| 5,457,718 A * | 10/1995 | Anderson et al. | ........... | 375/373 |
| 5,608,357 A * | 3/1997 | Ta et al. | ........................ | 331/57 |
| 5,636,248 A * | 6/1997 | Tash et al. | ................... | 375/282 |
| 6,002,731 A * | 12/1999 | Aoki et al. | ................. | 375/371 |
| 6,031,886 A * | 2/2000 | Nah et al. | .................... | 375/375 |
| 6,259,755 B1 * | 7/2001 | O'Sullivan et al. | ......... | 375/376 |
| 2003/0042957 A1 * | 3/2003 | Tamura | ..................... | 327/233 |
| 2003/0074609 A1 * | 4/2003 | Koyanagi et al. | ........... | 714/700 |

* cited by examiner

*Primary Examiner*—Pankaj Kumar
*Assistant Examiner*—Naheed Ejaz
(74) *Attorney, Agent, or Firm*—Noblitt & Gilmore LLC

(57) ABSTRACT

A skip-free retiming system and method for transmission of digital information in a plesiochronous data communication system is described. The system is capable of supporting an unlimited number of retimers in serial data path between a first and a last node. The retimers are configured to retime, amplify and retransmit a received data stream without altering the received data rate. Thus, the data rate from the first node is received at the same frequency at the last node, regardless of the number of retimers. In general, the retimer performs rate compensation on a retimer local clock, rather than on the data stream, so the attributes of the clean retimer clock can be applied to the data stream without changing the data rate.

15 Claims, 5 Drawing Sheets

PLESIOCHRONOUS DATA COMMUNICATIONS SYSTEM

FREQUENCY COMPENSATION USING SKIP SYMBOLS

TYPICAL RETIMERS IN A DATA COMMUNICATIONS SYSTEM

SKIP-FREE RETIMING

EXEMPLARY WAVEFORMS OF RETIMER 500

METHOD AND APPARATUS FOR SKIP-FREE RETIMING TRANSMISSION OF DIGITAL INFORMATION

CROSS REFERENCE TO RELATED APPLICATIONS

This application includes subject matter that is related to and claims priority from U.S. Provisional Patent Application Ser. No. 60/313,383 filed Aug. 17, 2001 and entitled Skip-Free Retiming.

FIELD OF INVENTION

The present invention relates generally to a system and method for transmission of digital information, and more particularly to a method and apparatus for skip-free retiming of information in digital data communication systems.

BACKGROUND OF THE INVENTION

High speed serial digital data information is often transmitted between nodes using synchronous, asynchronous or plesiochronous systems. Systems having synchronous frequency references, i.e., SONET systems, are typically expensive to operate. Lower cost data communications systems, i.e., DATACOM systems, can rely on plesiochronous systems. In plesiochronous systems, each node generally includes a local clock generated from a local frequency reference. The local clock typically has a small frequency difference (e.g., 100–200 ppm) from the incoming data frequency.

FIG. 1 illustrates, in block format, a conventional plesiochronous system 100 having a first node 101 and a second node 102. Node 101 has a local frequency reference, "Fref1", and node 102 has a local frequency reference, "Fref2". Each node, 101 and 102, also includes a synchronous digital subsystem, 104 and 105 respectively, based upon a clock rate ("Fc") derived from the local frequency reference. Node 101 transmits data at a frequency of Fc1 and node 102 receives the data. Node 102 has a clock rate of Fc2 which is close to the frequency of Fc1, but as is common in a plesiochronous system, Fc1 and Fc2 are generally not exactly equal. In order for node 102 to use the data at its clock rate of Fc2, frequency compensation must be performed on the Fc1 data stream when the rates are not the same.

FIG. 2 illustrates one common technique for frequency compensation using skip symbols. To accommodate the frequency rate compensation at each node, data communications receivers often employ protocols where bits are either added or removed from the incoming frequency stream. The compensation bits are called "skip symbols." For example, if the incoming frequency, Fc1, is faster than the local clock rate, Fc2, skip symbols are deleted from the stream to effectively "slow down" the stream. Alternatively, if the incoming frequency is slower than the local clock rate, skip symbols are inserted in the stream to "speed up" the flow.

Typical data communications systems reserve valid windows where the skip symbols can be added or removed. The number of reserved symbols in each window and the frequency of occurrence of these skip symbol add/remove windows determines the rate differences that can be accommodated. In general, there is a limited number of reserved symbols available in each window. For example, in Infiniband™ systems, there are only five symbols available for retiming. This means that for each data frame a maximum of five skip symbols can be added. Of course, for every skip symbol that is removed, a skip symbol can be added at the next retiming station. While there are generally five spaces or symbols available, one space must be reserved for frequency compensation at the end or last node and the remaining spaces are half filled with skip symbols. In other words, a typical data communications system is capable of adding up to two or deleting up to two skip symbols between the beginning and the end node. The fifth space must be reserved for any rate compensation needed at the last node (e.g., in a chain of nodes) to use the received data at the rate of the last node.

In wired data communication systems, the data between the nodes is typically transmitted over channels that include, for example, a printed circuit board, a coaxial cable, an optical fiber, or any combination thereof. The distance the data can be communicated over the channel is dependent upon the signal integrity, channel loss characteristics, noise and interference. Each of these factors affect the receiving end's (end node) ability to recover the clock and data at the required bit error rate (BER). In high data rate systems, the signal can become noisy (increased jitter) and attenuated as the signals traverse down the channel. This situation is commonly called "closed data eye."

The amount of eye closure is determined by the jitter from different sources such as the jitter in the input, jitter in the transmitter clock, finite rise and fall times, power supply and thermal noise, and bandwidth limitation and reflections in the interconnect. Since the effect of jitter is cumulative, jitter from all sources must be considered in determining the eye closure at the receiver, also referred to as the "jitter budget." The contribution of the input jitter to the output jitter is characterized by the jitter transfer, which is defined as the ratio of output jitter to input jitter as a function of the jitter frequency. In phase locked loop clock and data recovery systems, it is possible for the jitter transfer to be greater than unity, where the additional output jitter exceeds the input jitter at certain frequencies. The amount by which the additional output jitter exceeds the input jitter is defined as "jitter peaking." If the input jitter does not contribute to the output jitter, then the jitter budget is said to have been reset.

Retiming repeaters are commonly used at the receiving ends or in series with the channel to extend the distance the signal can travel. Retimers use a clean clock to retime the signal and remove the jitter (noise). The retimer also "opens the data eye" in the horizontal direction. Repeaters amplify the signal and open the data eye in amplitude. Thus, retiming repeaters both reset the jitter budget and increase the signal amplitude.

FIG. 3 illustrates, in block format, a data communication system 300 having a number of retiming repeaters 304, 305 in serial data path between a first node 301 and a second node 302. Retimer 304 uses a clean local frequency reference, Fref3, and resets the jitter budget. In a similar manner, retimer 305 uses a clean local frequency reference, Fref4, and resets the jitter budget. Fref3 and Fref4 are generally not at the same frequency. For simplification, two retiming repeaters are shown in system 300, however it should be realized that more or less may be used in a practical system.

In general, retiming repeaters employ the same methodology that the end nodes use to perform rate compensation by adding or deleting skip symbols. However, because the number of bits reserved for skip symbol addition or deletion is fixed in a data communication systems, there is a limit to the number of times a typical retiming repeater can be used between nodes. As previously discussed, there are generally a maximum number of skip symbols that can be used in each window, e.g., Infiniband reserves only five spaces for skip symbols, and one space must be reserved for the last node's use. Thus, the number of times the signal may be retimed is limited to the number of times skip symbols must be added, with the maximum number being two.

With continued reference to FIG. 3, the data rate is changed each time the signal is retimed. For example, node 301 transmits data at Fc1 which is received at retimer 304. The signal is retimed, amplified and transmitted at Fc3 (corresponding to Fref3). Note that Fc1 and Fc3 are generally close in frequency but generally not exact. The data, now at a frequency of Fc3, is received at retimer 305 where it is retimed, amplified and transmitted at Fc4 (corresponding to Fref4). Node 302 receives the data at a frequency of Fc4 and may perform rate compensation in order to use the data at the clock rate of node 302, i.e., Fref2. The entire process may be repeated, only in the opposite direction, for data transmitted from node 302 to node 301.

One alternative to the use of skip symbols, is to recover and filter the clock from the incoming data stream. Because these systems are dependent on filtering the noisy input data clock, jitter peaking occurs due to the jitter transfer characteristics of the filtering. Thus, while these systems do not use addition or deletion of skip symbols during channel travel, they are limited in the number of times the signal can be filtered due to jitter peaking.

SUMMARY OF THE INVENTION

The present invention overcomes the above prior art limitations and provides a system and method for skip-free retiming of digital information between nodes within a data communication system.

A skip-free data communication system of the invention generally includes a first node, a second node, and an unlimited number of retimers in serial data path between the nodes. The retimers are configured to receive a data stream from the first node at a data rate, Fc1, and retime the data stream by rate compensating a local clock of the retimer to match the Fc1 data stream. Thus, each retimer transmits a retimed data stream at a rate of Fc1. The second node receives the data stream at the rate of Fc1, regardless of the number of retimers between the nodes.

A retimer in accordance with an embodiment of the invention generally includes a clock and data recovery (CDR) circuit configured to recover a clock frequency from a received data stream and reclock the data. A memory device, such as a first-in first-out (FIFO), receives and stores the reclocked data. A frequency multiplier may be used to generate a clean reference clock slightly off in frequency from the data. A phase/frequency comparator may be used to determine the frequency offset between the reference clock and the recovered clock. A frequency shifter then uses the frequency offset to generate a clean data clock that is received at the memory device where a retimed data stream at the same frequency as the received data stream is retransmitted.

A method of skip-free retiming in a plesiochronous data communication system generally includes receiving a data stream at a first frequency and recovering a clock from the data stream. The recovered clock being at the first frequency and including jitter. A reference clock is generated that is free from jitter at a second frequency. The recovered clock and reference clock are compared to determine a frequency offset. The reference clock is phase shifted according to amount of frequency offset, and a retimed data stream at the first frequency, corresponding to the phase shifted clock, is transmitted.

BRIEF DESCRIPTION OF THE DRAWINGS

These and other features, aspects and advantages of the present invention will become better understood with reference to the following description, appending claims, and accompanying drawings where:

DETAILED DESCRIPTION

The subject matter of the present invention is particularly suited for use in connection with high speed digital data communication systems. As a result, the preferred exemplary embodiment of the present invention is described in that context. It should be recognized, however, that such description is not intended as a limitation on the use or applicability of the present invention, but is instead provided merely to enable a full and complete description of a preferred embodiment.

A skip-free retiming data communication system according to various aspects of the present invention is disclosed. Generally, a data communication system in accordance with the invention includes an unlimited number of retimers to reset the jitter budget between nodes. In addition, the system and method of the present invention does not alter the frequency of the original data stream during the retiming process. Thus, from beginning node to end node, the data is received and retransmitted at the same frequency.

Figure 1:
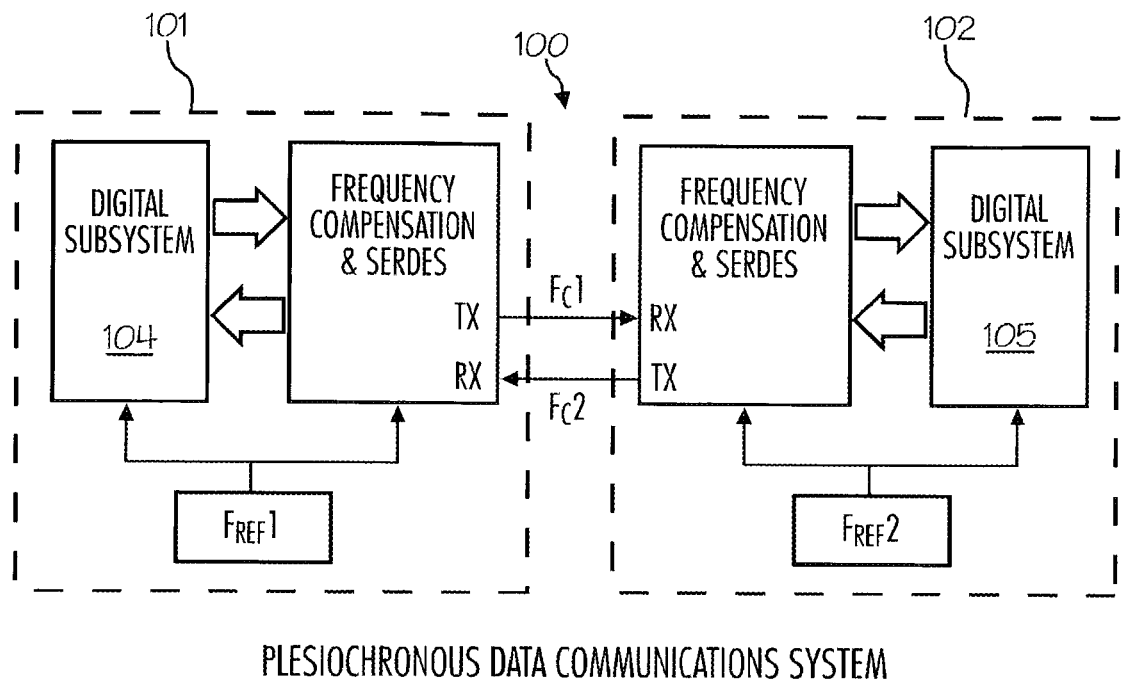
FIG. 1 illustrates, in block format, a conventional plesiochronous data communications system.
Figure 2:
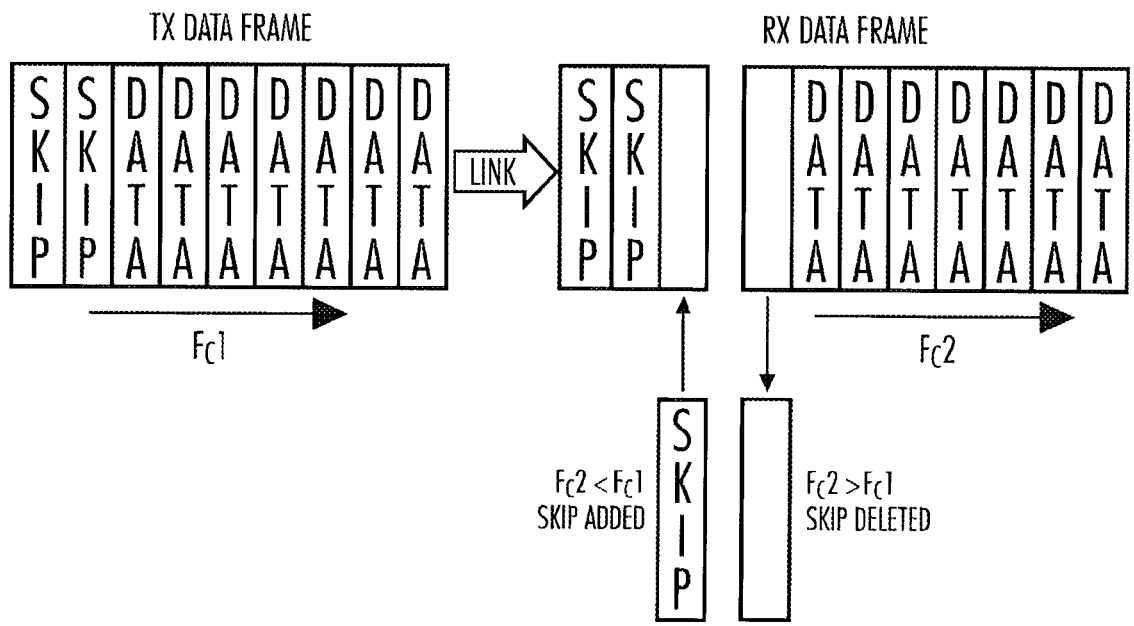
FIG. 2 illustrates a prior art technique of frequency compensation using skip symbols.
Figure 3:
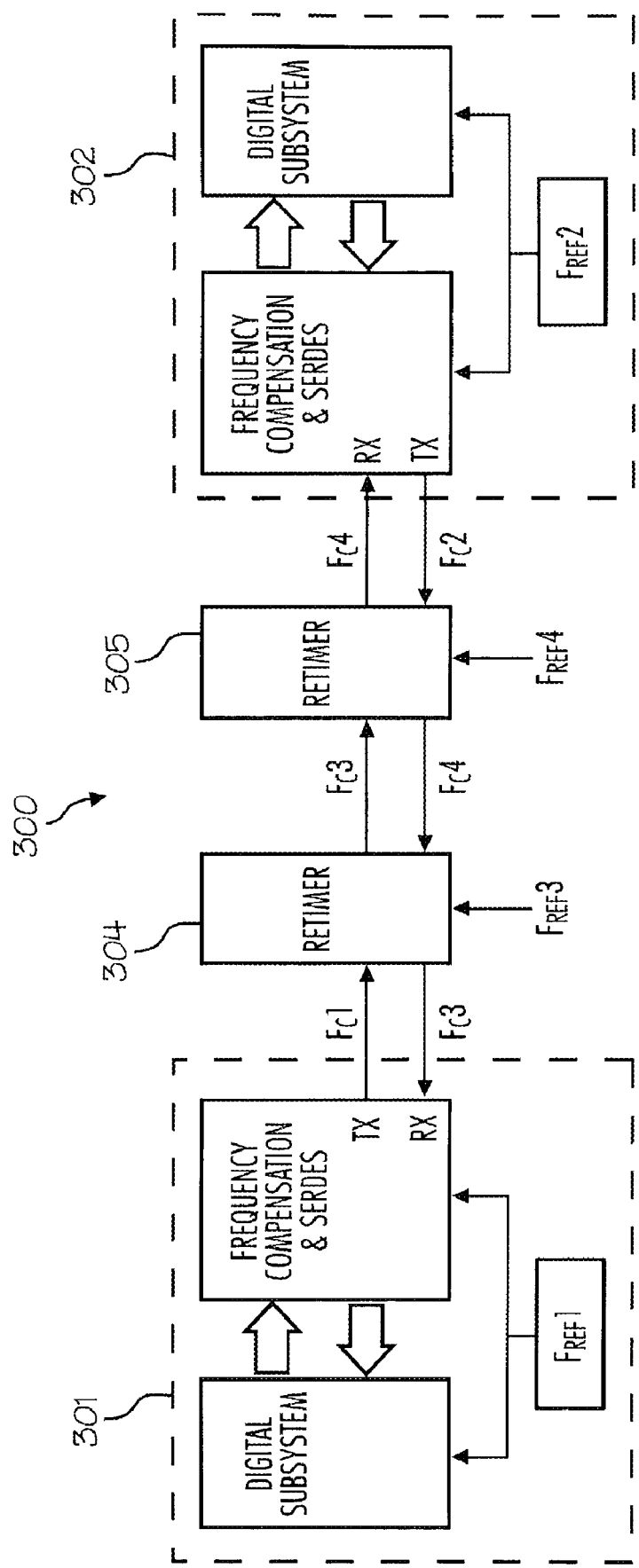
FIG. 3 illustrates, in block format, a conventional data communication system having typical retiming repeaters.
Figure 4:
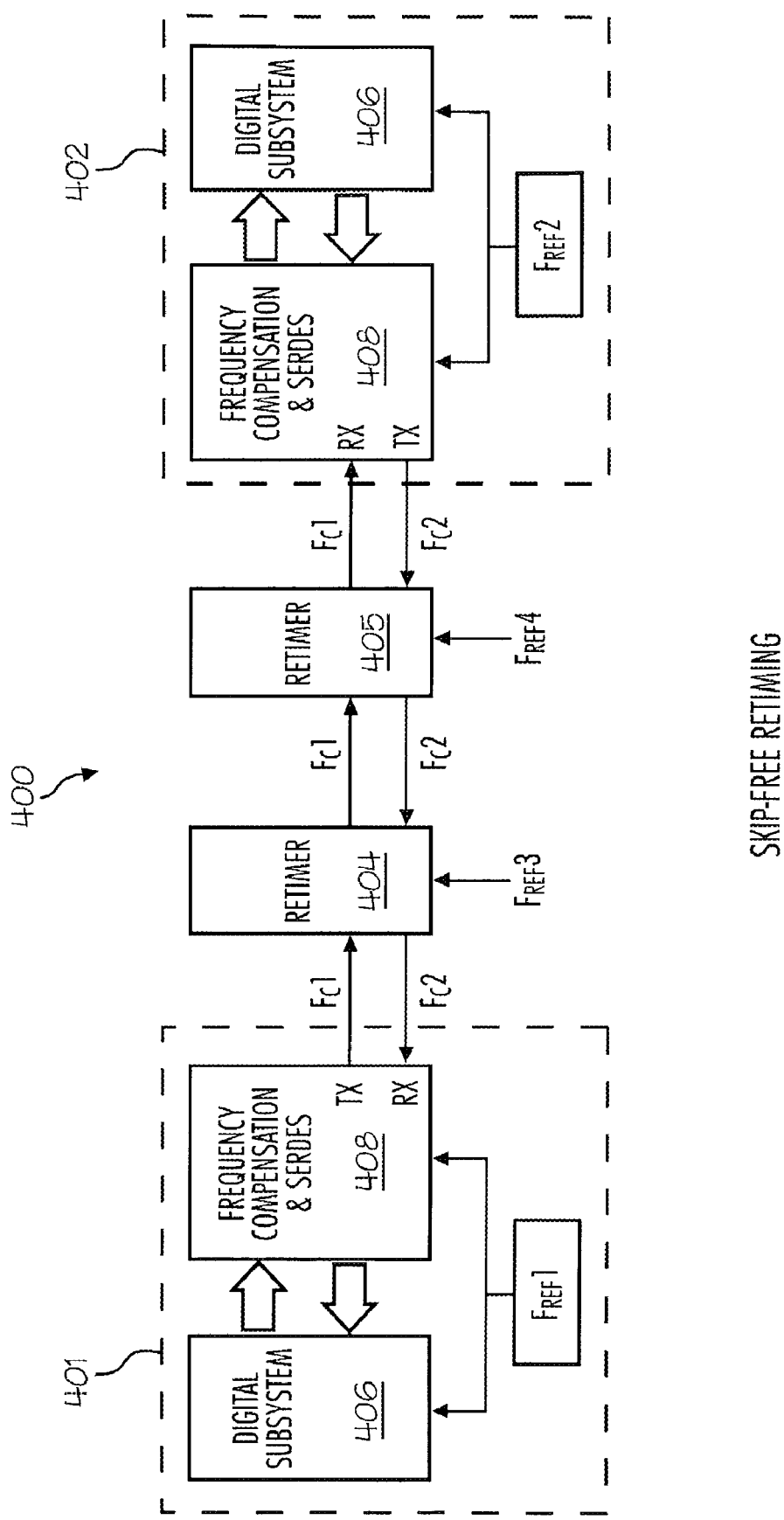
FIG. 4 illustrates, in block format, a skip-free retiming data communication system in accordance with one embodiment of the invention.

FIG. 4 illustrates, in block format, a skip-free retiming data communication system 400 according to one embodiment of the present invention. System 400 includes a first node 401, a second node 402 and a number of retimers 404, 405. It should be appreciated that for ease of understanding, a finite number of nodes and retimers are illustrated and discussed; however, a data communication system of the invention is not limited by the number of functional blocks illustrated or described, but rather, an unlimited number of retimers between nodes may be included in communication systems of the present invention.

Nodes 401 and 402 each include a digital subsystem 406 and a frequency compensator 408. Nodes 401 and 402 may include conventional nodes, such as nodes 101 and 102 described above. As illustrated, each node 401 and 402 typically includes a local frequency reference and a digital subsystem based upon a clock rate "Fc" derived from the local frequency reference. In the present embodiment, node 401 includes a local frequency reference "Fref1" and node 402 includes a local frequency reference "Fref2". As is common in plesiochronous systems, Fref1 and Fref2 are substantially close in frequency, but generally not exact. The frequency compensation system 408 of node 401 is configured to perform rate compensation on the incoming data, Fc2, so that node 401 can use the data. Similarly, the frequency compensation system 408 of node 402 is configured to perform rate compensation on the incoming data, Fc1, so that node 402 can use the data. In accordance with the present invention and as illustrated in FIG. 4, the data transmitted from node 401 at a rate of Fc1 is received at node 402 at the same rate of Fc1. In other words, the retimers included in serial data path between nodes 401 and 402 do not alter the frequency of the data from the first node and do not add or delete skip symbols to the data. The data is transmitted using "skip-free retiming."

Retimers 404 and 405 include a clean local reference, Fref3 and Fref4, respectively. The data is retimed at each of the retimers with the clean local clock to reset the jitter budget, but the frequency of the data is not altered. Thus, the data is transmitted from node 401 at a rate of Fc1. The data stream, Fc1, is received at a first retimer 404, retimed and transmitted at the same rate, Fc1. By performing rate compensation to the retimer local clock (instead of the data as in a typical system), the attributes of the clean retimer local clock can be applied to the data signal without changing the data rate. Skip symbols are not added to the data signal during retiming so there is no concern for the number of remaining available skip symbol windows and the number of retimers is not limited. Therefore, node 402 receives the data stream at a rate of Fc1 regardless of the number of times the signal was retimed and amplified.

Figure 5:
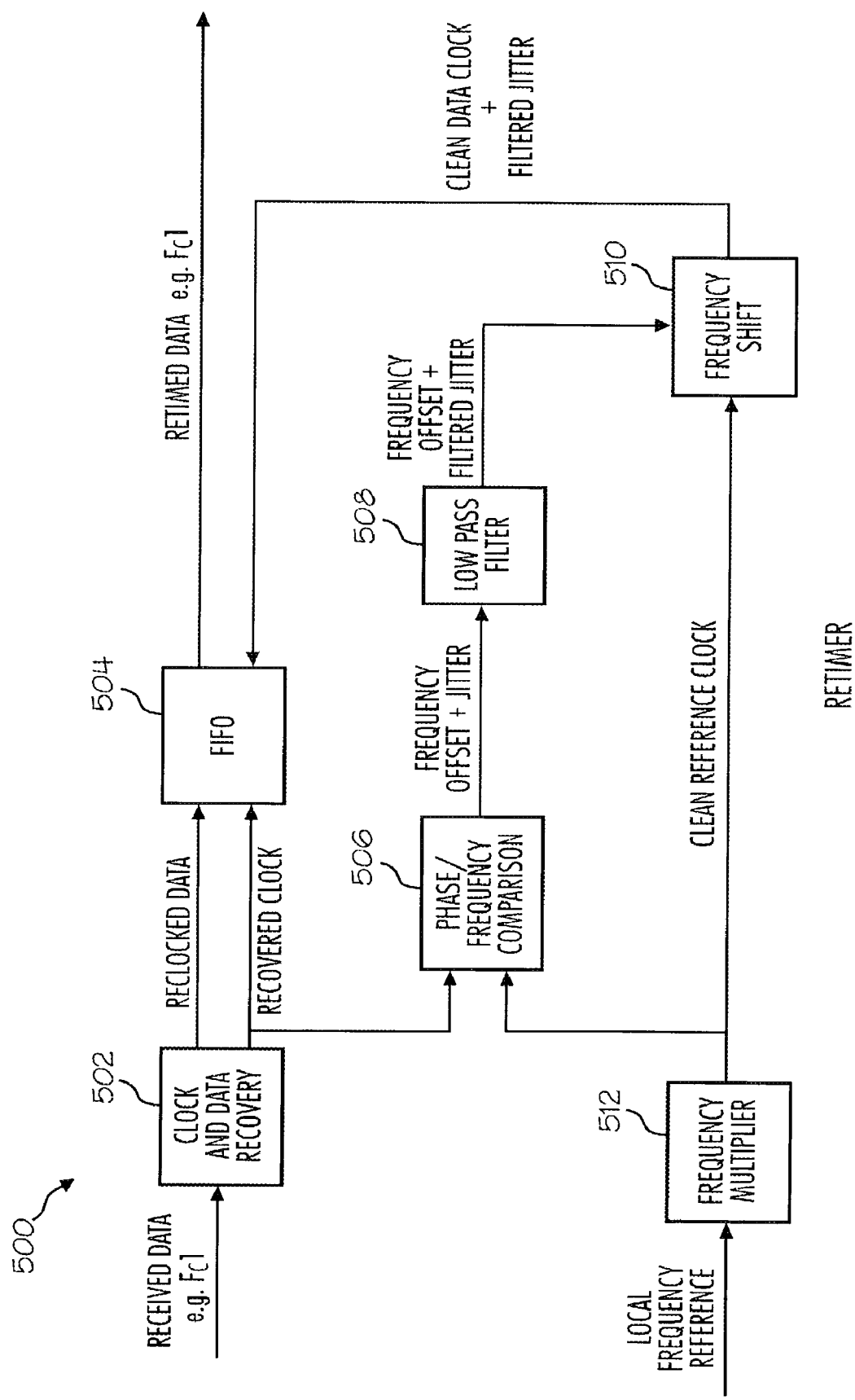
FIG. 5 illustrates, in block format, a retimer in accordance with one embodiment of the invention.

FIG. 5 illustrates, in block format, a retimer 500 in accordance with another embodiment of the present invention that is suitable for use in a skip-free retiming data communication system of the invention such as, for example, retimers 404 and 405. Retimer 500 generally includes a clock and data recovery (CDR) block 502, a memory device 504, such as a FIFO (first-in first-out), a phase/frequency comparator 506, a low pass filter 508, a frequency shifter 510, and a frequency multiplier 512. CDR 502 is configured to recover the clock frequency of the received data and uses the recovered clock to reclock the data. The recovered clock preferably tracks the input jitter to provide the most jitter tolerance possible (i.e., maximize the allowed jitter on the received data while still attaining error free operation). CDR 502 is preferably implemented with a CDR circuit and there are numerous CDR circuits known and available that perform the above functions that are suitable for implementation in system 500. For a specific example of a CDR circuit, see U.S. patent application Ser. No. 10/029,958, entitled, "PLL/DLL Dual Loop Data Synchronization."

FIFO device 504 is a memory component that receives and stores the reclocked data. It can be implemented, for example, as a set of registers or a dual port memory element such as static RAM. An exemplary FIFO device that is generally compatible with the present system is described in U.S. patent application Ser. No. 10/029,709 entitled, "PLL/DLL Dual Loop Data Synchronization Utilizing a Granular FIFO Fill Level Indicator", the entire contents of which are hereby incorporated by reference. FIFO 504 allows the input data to be written with one clock and read with another clock. FIFO 504 further allows the read clock frequency and phase to be varied such that no data is lost as long as the difference in read and write clock cycles does not exceed the FIFO memory depth. The output data stream is thus retimed by using a clean, unjittered clock to read the data that has been written into FIFO 504 using a jittery write clock.

To generate the clean, unjittered clock, a clean local frequency reference is supplied. This reference is typically at a frequency which is a submultiple of the data rate, so frequency multiplier 512 may be used to produce a clean reference clock that is slightly off in frequency from the data. The frequency offset can be determined using a phase or frequency comparator 506. The data signal received at comparator 506 still includes the jitter, so low pass filter 508 is included to filter out the high frequency noise. Low frequency jitter is essentially indistinguishable from the frequency stability of the data source and is therefore accommodated by the system's frequency accuracy tolerance. Frequency shift device 510 can then generate a clean clock at the data frequency which is received at FIFO device 504. Additional information on the discussed function blocks of retimer 500, e.g., comparator 506, filter 508 and frequency shift 510, may be found in U.S. patent application Ser. No. 10/029,958, entitled, "PLL/DLL Dual Loop Data Synchronization", the entire contents of which are hereby incorporated by reference.

Figure 6:
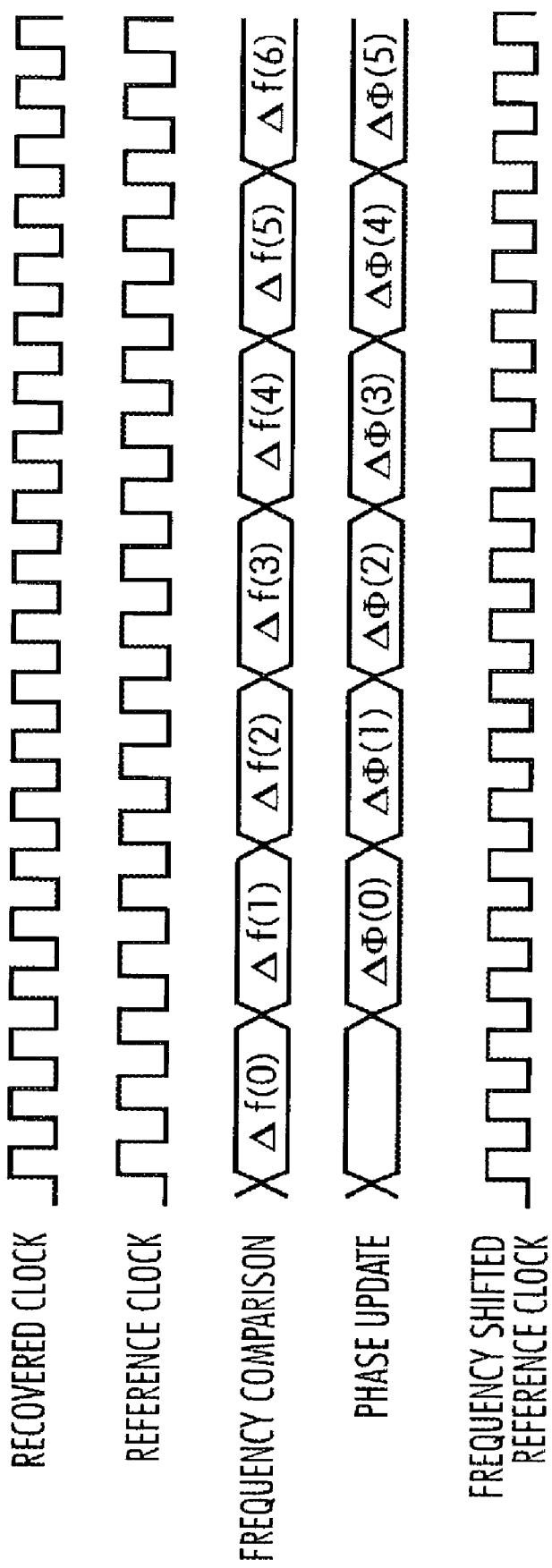
FIG. 6 illustrates exemplary waveforms of a retimer, e.g., the retimer of FIG. 5.

With combined reference to FIGS. 5 and 6, the operation of an exemplary retimer in accordance with the invention, e.g., retimer 500, in conjunction with the exemplary waveforms of FIG. 6 is discussed. In general, the following description details the operation of a retimer capable of receiving data at a rate, Fc1, and retiming and retransmitting the data at the same data rate, Fc1. The recovered clock (e.g., from CDR 502) is at the received data rate (e.g., Fc1), but includes unwanted jitter because the clock is tracking the input data jitter. The reference clock (e.g., from frequency multiplier 512) does not have jitter but is slightly off in frequency from the desired data rate. The recovered clock and reference clock frequencies are compared (e.g., in a phase/frequency comparator 506) to determine the frequency difference or offset between the two signals. The frequency difference may be in analog or digital format. The frequency difference is filtered (e.g., in low pass filter 508) to remove the jitter from the offset. The frequency difference is then used to compute a phase shift needed for the reference clock to match the recovered clock (e.g., in frequency shift 510). The frequency shift is generally achieved by applying the phase shift to the clean reference clock to obtain a transmit clock with filtered jitter at the desired data rate (e.g., Fc1).

It should be appreciated that the particular implementations shown and described herein are illustrative of various embodiments of the invention including its best mode, and are not intended to limit the scope of the present invention in any way. For instance, exemplary retimer 500 and the representative waveforms of FIG. 6 are provided merely to demonstrate a best mode of the invention. Those skilled in the art will recognize various other techniques that can be used in accordance with the invention. For example, a phase locked loop system may be used to lock the transmit clock to the recovered clock with the phase shift element inside the frequency multiplier phase locked loop.

For the sake of brevity, conventional techniques for signal processing, data transmission, signaling, and network control, and other functional aspects of the systems (and components of the individual operating components of the systems) may not be described in full detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

The invention claimed is:

1. A skip-free data communication system comprising:
   a first node configured to transmit a data stream at a first rate;
   a second node configured to transmit a data stream at a second rate; and
   a plurality of retimers in serial data path between said first and second nodes, said retimers configured to receive said data stream at said first rate and retime said data stream by rate compensating a local clock of each of said retimers to match said first rate, said retimers configured to transmit a retimed data stream at a rate of said first rate,
   wherein said retimed data stream is received at said second node at said first rate regardless of the number of said retimers between said first and second nodes.

2. The data communication system of claim 1, wherein the second node is configured to transmit a data stream at a second rate Fc2 to one of said retimers configured to receive said Fc2 data stream and retime said Fc2 data stream by rate compensating said local clock of said retimers to match said Fc2 data stream and to transmit a retimed data stream at a rate of Fc2 to said first node.

3. The data communication system of claim 1, wherein said retimers configured to reset a jitter budget and amplify said received data stream.

4. The data communication system of claim 1, wherein said plurality of retimers comprises an unlimited number.

5. The data communication system of claim 1, wherein said system comprises a plesiochronous system.

6. The data communication system of claim 1, wherein said first and second nodes comprise a digital subsystem and a frequency compensation system.

7. The data communication system of claim 1, wherein said retimers comprise:
   a clock and data recovery block configured to receive said data stream at said first rate, to recover a clock frequency from said received data stream, and to reclock said data stream;
   a memory device configured to receive and store said reclocked data stream;
   a frequency multiplier configured to generate said local clock;
   a phase comparator configured to determine a frequency offset between said local clock and said recovered clock; and
   a frequency shifter configured to generate a clean data clock corresponding to said frequency offset, said clean data clock being received at said memory device, wherein said retimed data stream being transmitted from said memory device at said first rate.

8. The data communication system of claim 7, wherein said memory device comprises a first-in first-out (FIFO) device.

9. The data communication system of claim 7, wherein said local clock being within a limited frequency offset of said first rate.

10. The data communication system of claim 7, further comprising a filter configured to receive said frequency offset and filter a jitter from said recovered clock.

11. A method of skip-free retiming in a plesiochronous data communication system, said method comprising:
    receiving a data stream at a first frequency;
    transmitting said data stream at said first frequency from a first node;
    recovering a clock from said data stream, said recovered clock being at said first frequency and including a jitter;
    receiving said data stream at said first frequency at a plurality of retimers and retiming said data stream such that each of said retimers transmits a retimed data stream at said first frequency, wherein retiming said data stream comprises:
       generating a reference clock free from jitter and having a second frequency for each of said retimers;
       comparing said recovered clock and said reference clock to determine a frequency offset;
       phase shifting said reference clock according to said frequency offset; and
       transmitting a retimed data stream at said first frequency; and
    receiving said data stream at said first frequency from said plurality of retimers at an end node.

12. The method of skip-free retiming of claim 11, further comprising filtering said frequency offset to remove said jitter.

13. The method of skip-free retiming of claim 11, further comprising receiving said data stream at a clock and data recovery (CDR) circuit.

14. The method of skip-free retiming of claim 13, further comprising reclocking said data stream at said first frequency at said CDR circuit.

15. The method of skip-free retiming of claim 11, further comprising storing said reclocked data stream in a FIFO (first-in first-out).

* * * * *